US010275972B2

(12) United States Patent
Cantley et al.

(10) Patent No.: US 10,275,972 B2
(45) Date of Patent: Apr. 30, 2019

(54) SYSTEM FOR GENERATING AND PROVIDING SEALED CONTAINERS OF TRACEABLE RESOURCES

(71) Applicant: Bank of America Corporation, Charlotte, NC (US)

(72) Inventors: Kerry Michelle Cantley, Fort Mill, SC (US); Rebecca Stepp Morgan, Charlottesville, VA (US); Sherri Sullivan, Newark, DE (US); James Wayland Pierce, Jr., Cornelius, NC (US); David Joseph Koval, Charlotte, NC (US); Brett C. Carter, Huntersville, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/598,597

(22) Filed: May 18, 2017

(65) Prior Publication Data
US 2018/0336753 A1 Nov. 22, 2018

(51) Int. Cl.
*G07D 11/00* (2006.01)
*G07F 19/00* (2006.01)
(Continued)

(52) U.S. Cl.
CPC ......... *G07D 11/0009* (2013.01); *G07D 7/003* (2017.05); *G07D 11/0042* (2013.01);
(Continued)

(58) Field of Classification Search
CPC ............. G07D 11/0009; G07D 7/003; G07D 11/0042; G07F 19/201; G07F 19/203; G06Q 20/1085
See application file for complete search history.

(56) References Cited

U.S. PATENT DOCUMENTS 2,612,092 A 9/1952 Heyer et al.
3,618,059 A 11/1971 Allen
(Continued)

FOREIGN PATENT DOCUMENTS

DE 4019265 C1 11/1991
DE 4429815 A1 2/1996
(Continued)

OTHER PUBLICATIONS

International Search Report and Written Opinion from corresponding PCT Application No. PCT/US2009/047452 dated Aug. 25, 2009.
(Continued)

*Primary Examiner* — Thien M Le
*Assistant Examiner* — Asifa Habib
(74) *Attorney, Agent, or Firm* — Michael A. Springs; Moore & Van Allen PLLC; Peter B. Stewart

(57) ABSTRACT

Embodiments of the present invention provide a system for providing a sealed container of traceable resources. The system may comprise receiving a request for an amount of resources to be provided in a sealed container. A set of individual resource items may be collected to meet this request. Information about the denominations and unique identifiers of these resource items may be identified, and each resource item can be verified for authenticity. The system may then secure the collected set of individual resource items in a container, apply a tamper-evident seal to the container, and apply an informational notification to the container. The informational notification may provide information on the makeup of the container contents as well as an indication of the verification of the contents. This sealed container can then be dispensed for future use.

20 Claims, 5 Drawing Sheets

(51) Int. Cl.
*G07D 7/00* (2016.01)
*G06Q 20/10* (2012.01)

(52) U.S. Cl.
CPC .......... *G07F 19/201* (2013.01); *G07F 19/203* (2013.01); *G06Q 20/1085* (2013.01)

(56) References Cited

U.S. PATENT DOCUMENTS

| | | |
|---|---|---|
| 3,767,080 A | 10/1973 | Erickson |
| 4,113,140 A | 9/1978 | Graef et al. |
| 4,186,477 A | 2/1980 | Bunch et al. |
| 4,313,601 A | 2/1982 | Graef et al. |
| 4,352,097 A | 9/1982 | Hamann et al. |
| 4,369,360 A | 1/1983 | Tsuji et al. |
| 4,443,692 A | 4/1984 | Nishimura |
| 4,622,456 A | 11/1986 | Naruto et al. |
| 4,784,274 A | 11/1988 | Mori et al. |
| 4,802,325 A | 2/1989 | Duncan |
| 4,820,909 A | 4/1989 | Kawauchi et al. |
| 4,910,944 A | 3/1990 | Segalowitz et al. |
| 4,992,648 A | 2/1991 | Hutchison et al. |
| 5,022,531 A | 6/1991 | Hahn et al. |
| 5,340,967 A | 8/1994 | Martin et al. |
| 5,411,249 A | 5/1995 | Zouzoulas et al. |
| 5,453,601 A | 9/1995 | Rosen et al. |
| 5,529,208 A | 6/1996 | Carstens et al. |
| 5,533,605 A | 7/1996 | Mays et al. |
| 5,561,281 A | 10/1996 | Eda et al. |
| 5,606,157 A | 2/1997 | Awatsu et al. |
| 5,680,472 A | 10/1997 | Conant et al. |
| 5,689,240 A | 11/1997 | Traxler et al. |
| 5,748,906 A | 5/1998 | Sandig |
| 5,748,908 A | 5/1998 | Yu et al. |
| 5,813,510 A | 9/1998 | Rademacher |
| 5,900,607 A | 5/1999 | Awatsu et al. |
| 5,931,634 A | 8/1999 | Neri et al. |
| 5,936,220 A | 8/1999 | Hoshino et al. |
| 5,952,639 A | 9/1999 | Ohki et al. |
| 5,952,920 A | 9/1999 | Braddick et al. |
| 5,953,423 A | 9/1999 | Rosen et al. |
| 5,963,131 A | 10/1999 | D'Angelo et al. |
| 5,996,314 A | 12/1999 | Pennini et al. |
| 6,014,649 A | 1/2000 | Kobayashi et al. |
| 6,021,397 A | 2/2000 | Jones et al. |
| 6,028,517 A | 2/2000 | Sansone et al. |
| 6,047,807 A | 4/2000 | Molbak et al. |
| 6,055,438 A | 4/2000 | Winner et al. |
| 6,065,672 A * | 5/2000 | Haycock ............ G07D 11/0009 235/379 |
| 6,082,519 A | 7/2000 | Martin et al. |
| 6,109,522 A | 8/2000 | Force et al. |
| 6,122,625 A | 9/2000 | Rosen et al. |
| 6,167,378 A | 12/2000 | Webber et al. |
| 6,260,024 B1 | 7/2001 | Shkedy |
| 6,278,795 B1 | 8/2001 | Anderson et al. |
| 6,363,164 B1 | 3/2002 | Jones et al. |
| 6,378,770 B1 | 4/2002 | Clark et al. |
| 6,483,433 B2 | 11/2002 | Moskowitz |
| 6,487,542 B2 | 11/2002 | Ebata |
| 6,491,216 B1 | 12/2002 | May |
| 6,498,603 B1 | 12/2002 | Wallace |
| 6,502,746 B1 | 1/2003 | Do et al. |
| 6,513,303 B2 | 2/2003 | Neri |
| 6,523,742 B1 | 2/2003 | Awatsu et al. |
| 6,526,273 B1 | 2/2003 | Link, II et al. |
| 6,550,221 B1 | 4/2003 | Neri |
| 6,550,671 B1 | 4/2003 | Brown et al. |
| 6,584,754 B1 | 7/2003 | Neri |
| 6,607,124 B1 | 8/2003 | Junkins et al. |
| 6,633,881 B2 | 10/2003 | Drobish et al. |
| 6,659,258 B2 | 12/2003 | Otsuka |
| 6,715,670 B1 | 4/2004 | Swiatek et al. |
| 6,736,314 B2 | 5/2004 | Cooper et al. |
| 6,788,203 B1 | 9/2004 | Roxbury et al. |
| 6,845,905 B2 | 1/2005 | Blad et al. |
| 6,848,612 B2 | 2/2005 | Uematsu et al. |
| 6,922,973 B1 | 8/2005 | Hofmann et al. |
| 6,934,688 B2 | 8/2005 | Carter |
| 6,983,836 B2 | 1/2006 | Adams et al. |
| 7,004,385 B1 | 2/2006 | Douglass |
| 7,042,360 B2 | 5/2006 | Light et al. |
| 7,076,458 B2 | 7/2006 | Lawlor et al. |
| 7,121,461 B2 | 10/2006 | Washington et al. |
| 7,149,336 B2 | 12/2006 | Jones et al. |
| 7,201,313 B1 | 4/2007 | Ramachandran |
| 7,212,992 B2 | 5/2007 | Kanevsky et al. |
| 7,216,800 B1 | 5/2007 | Ramachandran |
| 7,219,083 B2 | 5/2007 | Bellucci et al. |
| 7,232,024 B2 | 6/2007 | Mazur et al. |
| 7,243,080 B2 | 7/2007 | Bhadra |
| 7,248,160 B2 | 7/2007 | Mangan et al. |
| 7,269,279 B2 | 9/2007 | Chiles |
| 7,284,692 B1 | 10/2007 | Douglass |
| 7,334,381 B2 | 2/2008 | Mertz, II et al. |
| 7,347,358 B2 | 3/2008 | Ireland et al. |
| 7,348,886 B2 | 3/2008 | Himberger et al. |
| 7,350,230 B2 | 3/2008 | Forrest |
| 7,357,303 B2 | 4/2008 | Taniyama et al. |
| 7,375,638 B2 | 5/2008 | Light et al. |
| 7,461,780 B2 | 12/2008 | Potts et al. |
| 7,474,217 B2 | 1/2009 | Himberger et al. |
| 7,513,417 B2 | 4/2009 | Burns et al. |
| 7,513,419 B1 | 4/2009 | Crews et al. |
| 7,516,601 B2 | 4/2009 | Horiuchi |
| 7,537,153 B2 | 5/2009 | Hurwitz et al. |
| 7,559,183 B2 | 7/2009 | Bell |
| 7,577,612 B2 | 8/2009 | Waller et al. |
| 7,588,185 B2 | 9/2009 | Berquist et al. |
| 7,599,543 B2 | 10/2009 | Jones et al. |
| 7,602,956 B2 | 10/2009 | Jones et al. |
| 7,623,033 B2 | 11/2009 | Ainsworth et al. |
| 7,650,231 B2 | 1/2010 | Gadler |
| 7,659,816 B2 | 2/2010 | Wandel |
| 7,669,757 B1 | 3/2010 | Crews et al. |
| 7,714,708 B2 | 5/2010 | Brackmann et al. |
| 7,719,423 B2 | 5/2010 | Himberger et al. |
| 7,748,610 B2 | 7/2010 | Bell et al. |
| 7,778,456 B2 | 8/2010 | Jones et al. |
| 7,900,829 B1 | 3/2011 | Folk et al. |
| 7,903,863 B2 | 3/2011 | Jones et al. |
| 7,908,188 B2 | 3/2011 | Flynn et al. |
| 7,965,184 B1 | 6/2011 | Nichols et al. |
| 7,982,604 B2 | 7/2011 | Nichols et al. |
| 7,982,610 B1 | 7/2011 | Nichols et al. |
| 8,056,305 B1 | 11/2011 | Folk et al. |
| 8,078,534 B1 | 12/2011 | Nichols et al. |
| 8,094,021 B2 | 1/2012 | Nichols et al. |
| 8,276,810 B2 | 10/2012 | Cole et al. |
| 8,341,077 B1 | 12/2012 | Nichols et al. |
| 8,396,278 B2 | 3/2013 | Jones et al. |
| 8,430,303 B1 | 4/2013 | Sanders et al. |
| 8,459,540 B2 | 6/2013 | Brindley |
| 8,469,262 B2 | 6/2013 | Mon et al. |
| 8,523,235 B2 | 9/2013 | Kwak et al. |
| 8,550,338 B1 | 10/2013 | Nichols et al. |
| 8,556,167 B1 | 10/2013 | Nichols et al. |
| 8,567,664 B2 | 10/2013 | Goodwin et al. |
| 8,571,948 B1 | 10/2013 | Nichols et al. |
| 8,577,802 B1 | 11/2013 | Nichols et al. |
| 8,600,842 B1 | 12/2013 | Sanders et al. |
| 8,601,771 B2 | 12/2013 | Folk et al. |
| 8,655,045 B2 | 2/2014 | Jones et al. |
| 8,844,804 B2 | 9/2014 | Blachowicz et al. |
| 9,004,352 B1 * | 4/2015 | Graef ................ G07D 11/0096 235/379 |
| 9,058,626 B1 * | 6/2015 | Donaho ................ G06Q 40/02 |
| 9,141,876 B1 | 9/2015 | Jones |
| 9,311,671 B2 | 4/2016 | Folk et al. |
| 9,495,705 B2 | 11/2016 | Blachowicz et al. |
| 2001/0020638 A1 | 9/2001 | Uematsu et al. |
| 2001/0042785 A1 | 11/2001 | Walker et al. |
| 2001/0051922 A1 | 12/2001 | Waller et al. |
| 2001/0054643 A1 | 12/2001 | Siemens |
| 2002/0052193 A1 | 5/2002 | Chetty |

(56) References Cited

U.S. PATENT DOCUMENTS

| | | |
|---|---|---|
| 2002/0052794 A1 | 5/2002 | Bhadra |
| 2002/0082994 A1 | 6/2002 | Herziger |
| 2002/0091937 A1 | 7/2002 | Ortiz |
| 2002/0095588 A1 | 7/2002 | Shigematsu et al. |
| 2002/0111916 A1 | 8/2002 | Coronna et al. |
| 2002/0120572 A1 | 8/2002 | Bellucci et al. |
| 2002/0138424 A1 | 9/2002 | Coyle |
| 2002/0194122 A1 | 12/2002 | Knox et al. |
| 2002/0195309 A1 | 12/2002 | Pope |
| 2003/0004870 A1 | 1/2003 | Van Rensburg et al. |
| 2003/0011466 A1 | 1/2003 | Samuel et al. |
| 2003/0050891 A1 | 3/2003 | Cohen et al. |
| 2003/0061153 A1 | 3/2003 | Birdsong et al. |
| 2003/0083936 A1 | 5/2003 | Mueller et al. |
| 2003/0083969 A1 | 5/2003 | Uchiyama et al. |
| 2003/0122671 A1 | 7/2003 | Jespersen |
| 2003/0163710 A1 | 8/2003 | Ortiz et al. |
| 2003/0177102 A1 | 9/2003 | Robinson |
| 2003/0208431 A1 | 11/2003 | Raynes et al. |
| 2003/0213843 A1 | 11/2003 | Jackson |
| 2003/0234719 A1 | 12/2003 | Denison et al. |
| 2003/0236589 A1 | 12/2003 | Myatt |
| 2004/0016796 A1 | 1/2004 | Hanna et al. |
| 2004/0056767 A1 | 3/2004 | Porter |
| 2004/0069591 A1 | 4/2004 | Ito |
| 2004/0083149 A1 | 4/2004 | Jones |
| 2004/0100379 A1 | 5/2004 | Boman et al. |
| 2004/0111346 A1 | 6/2004 | Macbeath et al. |
| 2004/0117302 A1 | 6/2004 | Weichert et al. |
| 2004/0124966 A1 | 7/2004 | Forrest |
| 2004/0201454 A1 | 10/2004 | Waterhouse et al. |
| 2004/0215566 A1 | 10/2004 | Meurer |
| 2004/0217162 A1 | 11/2004 | Chigira et al. |
| 2005/0011721 A1 | 1/2005 | Armanini et al. |
| 2005/0027594 A1 | 2/2005 | Yasnovsky et al. |
| 2005/0080731 A1 | 4/2005 | Dnyaneshwar |
| 2005/0091129 A1 | 4/2005 | Tien |
| 2005/0096986 A1 | 5/2005 | Taylor et al. |
| 2005/0108164 A1 | 5/2005 | Salafia et al. |
| 2005/0183928 A1 | 8/2005 | Jones et al. |
| 2005/0189266 A1 | 9/2005 | Fujita et al. |
| 2005/0258234 A1 | 11/2005 | Silverbrook et al. |
| 2005/0273347 A1 | 12/2005 | Dudley et al. |
| 2005/0284728 A1 | 12/2005 | Corrick et al. |
| 2006/0022032 A1 | 2/2006 | Fillinger et al. |
| 2006/0120519 A1 | 6/2006 | Tamari et al. |
| 2006/0131395 A1 | 6/2006 | Potts et al. |
| 2006/0212372 A1 | 9/2006 | Eberhard et al. |
| 2006/0247973 A1 | 11/2006 | Mueller et al. |
| 2006/0271441 A1 | 11/2006 | Mueller et al. |
| 2006/0282277 A1 | 12/2006 | Ng |
| 2006/0288233 A1 | 12/2006 | Kozlay |
| 2007/0005452 A1 | 1/2007 | Klingenberg et al. |
| 2007/0008118 A1 | 1/2007 | Kassiedass |
| 2007/0012602 A1 | 1/2007 | Baldassari et al. |
| 2007/0034683 A1 | 2/2007 | Eastman et al. |
| 2007/0045395 A1 | 3/2007 | Corona et al. |
| 2007/0063016 A1 | 3/2007 | Myatt et al. |
| 2007/0100750 A1 | 5/2007 | Hartfield et al. |
| 2007/0102439 A1 | 5/2007 | Bell |
| 2007/0109097 A1 | 5/2007 | Coutermarsh et al. |
| 2007/0151827 A1 | 7/2007 | Brandstrom et al. |
| 2007/0174156 A1 | 7/2007 | Emde et al. |
| 2007/0187485 A1 | 8/2007 | Aas et al. |
| 2007/0198341 A1 | 8/2007 | Park |
| 2007/0226142 A1 | 9/2007 | Hanna et al. |
| 2007/0228151 A1 | 10/2007 | Yokoi et al. |
| 2007/0282724 A1 | 12/2007 | Barnes et al. |
| 2008/0005019 A1 | 1/2008 | Hansen |
| 2008/0005578 A1 | 1/2008 | Shafir |
| 2008/0029949 A1 | 2/2008 | Hansson |
| 2008/0103959 A1 | 5/2008 | Carroll et al. |
| 2008/0116259 A1 | 5/2008 | Oberan |
| 2008/0120237 A1 | 5/2008 | Lin |
| 2008/0126515 A1 | 5/2008 | Chambers et al. |
| 2008/0134849 A1 | 6/2008 | McGough |
| 2008/0149706 A1 | 6/2008 | Brown et al. |
| 2008/0155269 A1 | 6/2008 | Yoshikawa |
| 2008/0158002 A1* | 7/2008 | Parkinson .......... G08B 13/1436 340/8.1 |
| 2008/0199155 A1 | 8/2008 | Hagens et al. |
| 2008/0223930 A1 | 9/2008 | Rolland et al. |
| 2008/0236101 A1 | 10/2008 | Horiuchi |
| 2008/0249934 A1 | 10/2008 | Purchase et al. |
| 2008/0262949 A1 | 10/2008 | Bond et al. |
| 2008/0265019 A1* | 10/2008 | Artino ................ G06Q 20/1085 235/379 |
| 2008/0303903 A1 | 12/2008 | Bentley et al. |
| 2009/0001158 A1 | 1/2009 | Walters |
| 2009/0006249 A1 | 1/2009 | Morgan et al. |
| 2009/0006250 A1 | 1/2009 | Bixler et al. |
| 2009/0032580 A1 | 2/2009 | Blachowicz et al. |
| 2009/0034802 A1 | 2/2009 | Frei et al. |
| 2009/0051566 A1 | 2/2009 | Olsen et al. |
| 2009/0051769 A1 | 2/2009 | Kuo et al. |
| 2009/0065573 A1 | 3/2009 | Potts et al. |
| 2009/0107800 A1 | 4/2009 | Nishida et al. |
| 2009/0114716 A1 | 5/2009 | Ramachandran |
| 2009/0140039 A1 | 6/2009 | Force et al. |
| 2009/0164364 A1 | 6/2009 | Galit et al. |
| 2009/0187482 A1 | 7/2009 | Blount et al. |
| 2009/0216662 A1 | 8/2009 | Crist et al. |
| 2009/0242626 A1 | 10/2009 | Jones et al. |
| 2010/0052844 A1 | 3/2010 | Wesby |
| 2010/0076853 A1 | 3/2010 | Schwarz |
| 2010/0116619 A1* | 5/2010 | Jones ................ G07D 11/0066 194/217 |
| 2010/0274723 A1 | 10/2010 | Joao |
| 2014/0166745 A1* | 6/2014 | Graef ...................... G07F 19/00 235/379 |
| 2014/0339301 A1* | 11/2014 | Angus ................... G06Q 40/04 235/379 |
| 2015/0095203 A1 | 4/2015 | Howe |
| 2015/0098642 A1* | 4/2015 | Jacomet ............. G07D 11/0066 382/135 |

FOREIGN PATENT DOCUMENTS

| | | | |
|---|---|---|---|
| DE | 19512045 A1 | 10/1996 | |
| DE | 19846452 A1 | 12/1999 | |
| DE | 20013021 U1 | 1/2001 | |
| DE | 102004039365 A1 | 2/2006 | |
| DE | 102005047711 A1 | 4/2007 | |
| EP | 852279 A2 | 7/1998 | |
| EP | 1477949 A1 | 11/2004 | |
| EP | 1486923 A2 | 12/2004 | |
| GB | 2304953 A | 3/1997 | |
| JP | 2008171334 A | 7/2008 | |
| WO | 9933040 A1 | 7/1999 | |
| WO | 03034359 A1 | 4/2003 | |
| WO | WO 03046842 A1 * | 6/2003 | ............ B32B 27/36 |
| WO | 2005038623 A2 | 4/2005 | |
| WO | 2005041385 A2 | 5/2005 | |
| WO | 2005106722 A1 | 11/2005 | |

OTHER PUBLICATIONS

European Search Report in EP09007879 dated Oct. 1, 2009.
European Search Report in EP09007878 dated Oct. 1, 2009.
International Preliminary Report on Patentability for International Application No. PCT/US2010/029237 dated Oct. 13, 2011.
International Search Report and the Written Opinion of the International Searching Authority dated Jun. 2, 2010 for International Application No. PCT/US2010/029237.
Merriam Webster Website, Definition of "retrofit" retrieved from http://www.merriam-webster.com/dictionary/retrofit on Dec. 15, 2011.
Merriam Webster Website, Synonyms of "alert" retrieved from http://www.merriam-webster.com/thesaurus/alert on Dec. 15, 2011.
PCT/US09/65281, International Search Report and Written Opinion, dated Jan. 12, 2010.

(56) References Cited

OTHER PUBLICATIONS

International Search Report and Written Opinion for International Application No. PCT/US2007/088650, dated Sep. 16, 2008, 10 pages.
PR_Newswire; "Airborne Express Announces New Pricing"; New York, Jan. 29, 2001.
Anonymous; "Parcel Pickup now a click away at Canada Post"; Canada Newswire; Aug. 31, 2011.
Oracle Database SQL Reference, 109 Release 1 (10.1), Part No. B10759-01, Dec. 2003.
Powerpoint Presentation, DTS Product Overview, IFS, Apr. 2006, 17 pages.
Durbin, "Ford's F-150 goes high-tech", retrieved from <http://www.wheels_ca/article/173134>, Feb. 6, 2008, 4 pages.
Monthly Minutes from Banking Technology Operations Standing Committee (BTO), dated Mar. 20, 2007, 2 pages.
Hem, "Adaptation/Loomis cashes in on technology/The armored car company defies obsolescence despite a declining use of coins and bills", Houston Chronicle, retrieved from <http://www.chron.com/CDA/archives/archive.mpl?id=2008 4523451>, Mar. 1, 2008, 2 pages.
Powerpoint Presentation, Guck, "PakTrak", Cash Shipment Package Tracking Concept Overview, Draft-Version 1.0, Mar. 14, 2008, 17 pages.
Powerpoint Presentation, RFID in Banking, May 21, 2008, 12 pages.
Monthly Minutes for RFID SIG dated Mar. 19, 2008, 2 pages.
Web link: http://www.reghardware.co.uk/2009/05/25/handset apps for blind/print.html, Phone Apps Help Blind 'see'(video), 2 pages.
Web link: http://www.knfbreader.com/products-mobile.php; "knfbReader Mobile", 2 pages.
Web link: http//www.maccast.com/2009/07/01/maccast-2009-07-01-iphone-3gs-accessibility/; 6 pages.
Website: http://www.snaptell.com/; 1 page.
Hackman, Mark, "Hands Off with Google Goggles", Dec. 8, 2009, Web link: http://www.pcmag.com/article2/0,2817,2356786,00.asp; 4 pages.
Web link: http://braillebookstore.com/view.php?T=Pocket+Money+Brailler, Product = Pocket Money Brailler; 2 pages.
Pickens, Hugh, "BrainPort Lets the Blind 'See' With Their Tongues"; Web link: http://hardware.slashdot.org/article.pl?sid=09/08/22/2035256; 3 pages.
Caesar, "New Graphic Displays for the Blind", Dec. 22, 2004; Web link: http://www.physorg.com/news2474.html.
Website: http://maxiaids.com/store/prodIndex.asp?idStore=1 [Products for Independent Living: Blind & Low Vision Store]; 2 pages.
MacDonald, Jay (Bankrate.com), "Changes to Currency May Help the Blind", Oct. 13, 2008; Web link: http://bankrate.com/finance/checking/changes-to-currency-may-help-the-blind-1.aspx; 2 pages.
MacDonald, Jay (Bankrate.com), "Changes to Currency May Help the Blind", Oct. 13, 2008; Web link: http://bankrate.com/yho/news/pf/20081013_blind_currency_changes_a2.asp; 2 pages.
O'Brien, Maggie and Jordon, Steve (Omaha World-Herald), "no. Single Solution to Blind-Friendly Currency", May 21, 2008, web link: http://www.acb.org/nebraska/legislation/accessible-currency/news-articles/no-single-solution-to-blind-friendly-currency.html; 5 pages.
Web link: www.halfbakery.com/idea/blind_20friendly_20currency; Blind Friendly Currency, 15 pages.
Website: www.acb.org/resources/index.html; American Council of the Blind Helpful Resources for Blind and Visually Impaired Persons, 4 pages.
Web link: www.abledata.com/abledata.cfm?pageid=19327&top=14673&trail=22,13134&discontinued=0, Products: Voice Output Paper Money Identifier, 2 pages.
Vicini, James (Washington, D.C.), "U.S. Court: Currency Discriminates Against the Blind", May 20, 2008, Web Link: http://www.reuters.com/article/idUSN2030825720080520, 3 pages.
eHow Contributing Writer, Web link: http://www.ehow.com/how_2043858_help-blind-arrange-currency-their.html, 2 pages.
Web link: http://en.wikipedia.org/wiki/Wired_glove [Wired Glove Information]; 3 pages.

\* cited by examiner

SYSTEM FOR GENERATING AND PROVIDING SEALED CONTAINERS OF TRACEABLE RESOURCES

FIELD OF THE INVENTION

The present invention is generally directed to the field of secure resource distribution.

BACKGROUND

Conducting exchanges for goods and services with resources is desirable for many merchants, but the process of parsing through each of the received resources to identify information about each individual resource and, importantly, the authenticity of each resource can be a complex and time consuming task. This problem poses a particularly difficult challenge as the number or value of the received resources increases.

Therefore, a need exists to generate and provide sealed containers of traceable resources in a manner that is secure and additionally provides parties to an exchange with the confidence that the resources being exchanged are in fact authentic and have the purported value. This need is satisfied by the system for generating and providing sealed containers of traceable cash, as described herein.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for generating and providing sealed containers of traceable cash. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving a request for an amount of cash in a sealed container. After receiving this request, the system may collect a set of individual bank notes with a total value equal to the requested amount of cash. After collecting the set of individual bank notes, the system may identify a denomination and a serial number for each bank note of the set of individual bank notes, as well as a quantity of each bank note denomination for the set of individual bank notes. Next, the system may verify each bank note of the set of individual bank notes. In response to verifying each bank note of the individual bank notes, the system may secure the collected set of individual bank notes in a container. The system may then apply a tamper-evident seal to the container and apply an informational notification to the container or the tamper-evident seal. The informational notification may comprise an indication of the total value, the quantity of each bank note denomination, and the serial number of each bank note of the set of individual bank notes. Finally, the system may dispense the container comprising the tamper-evident seal and the informational notification.

In some embodiments of the system, receiving the request for the amount of cash in the sealed container is associated with a deposited amount of cash, wherein the deposited amount of cash comprises the set of individual bank notes. Additionally or alternatively, in some embodiments of the system, the request for the amount of cash in the sealed container comprises a request for a preset amount of cash.

The system may additionally or alternatively identify a first individual bank note of a first denomination from the set of individual bank notes that cannot be verified. In response to identifying the first individual bank note that cannot be verified, the system may remove the first individual bank note from the collected set of individual bank notes and replace the first individual bank note with a verified replacement individual bank note of the first denomination.

The container of the system may comprise a box, a bag, a packet, a strap, a band, an envelope, shrink wrap, or any other container that is configured to securely store bank notes or other important documents.

Furthermore, the informational notification of the system may comprise a near field communication (NFC) chip, a radio frequency identification (RFID) tag, a bar code, a quick response (QR) code, and/or a global positioning system (GPS) tag.

Finally, in some embodiments, the system may additionally receive the container comprising the collected and verified amount of cash and determine that the tamper-evident seal is still intact. In response to determining that the tamper-evident seal is intact, the system may bypass a new verification processes for the collected and verified amount of cash secured in the container.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
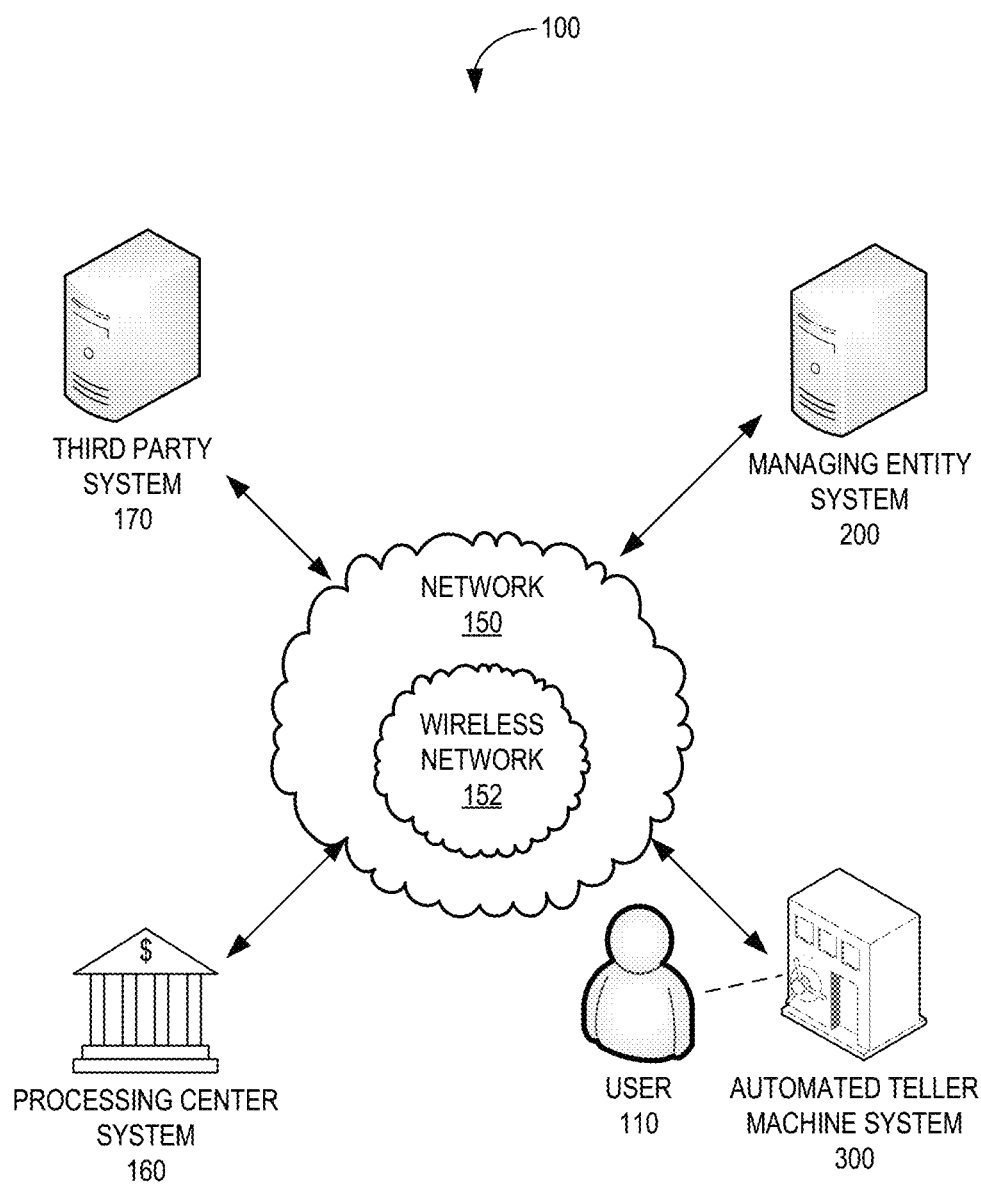
Figure 2:
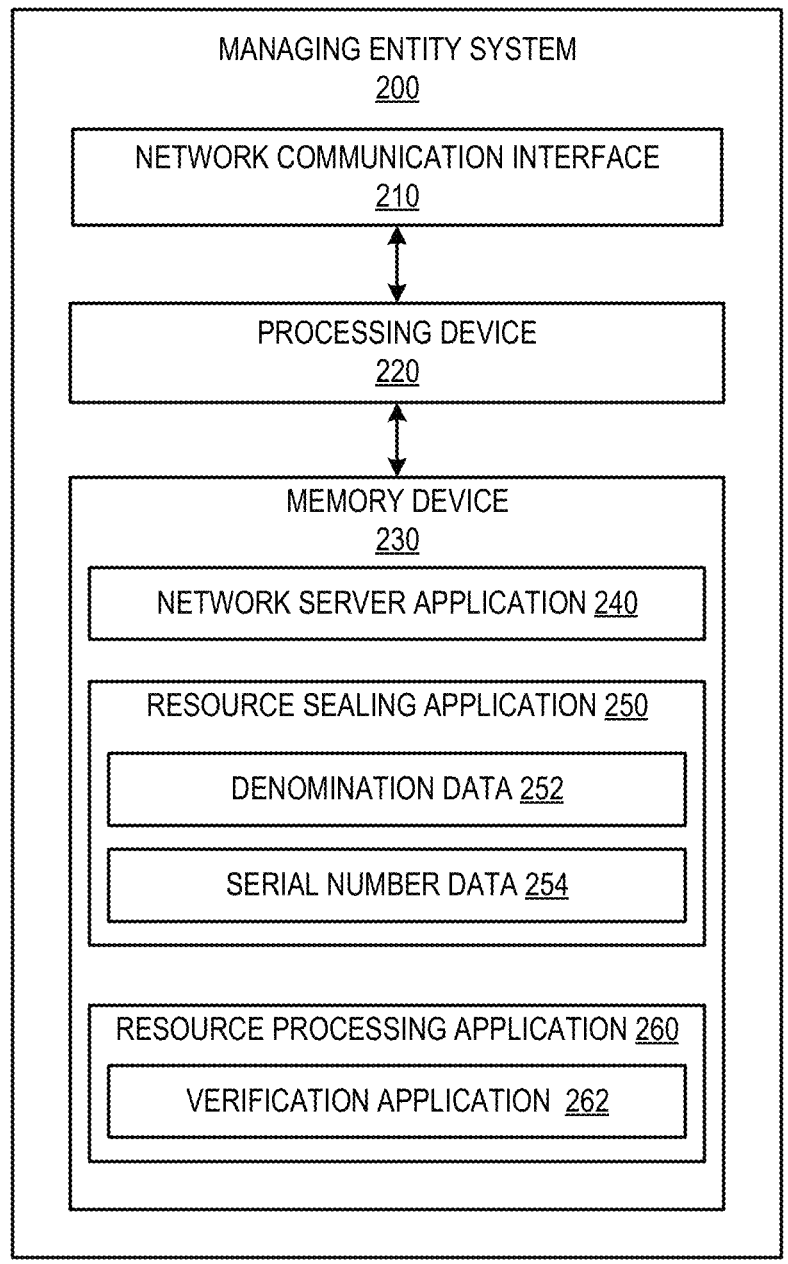
Figure 3:
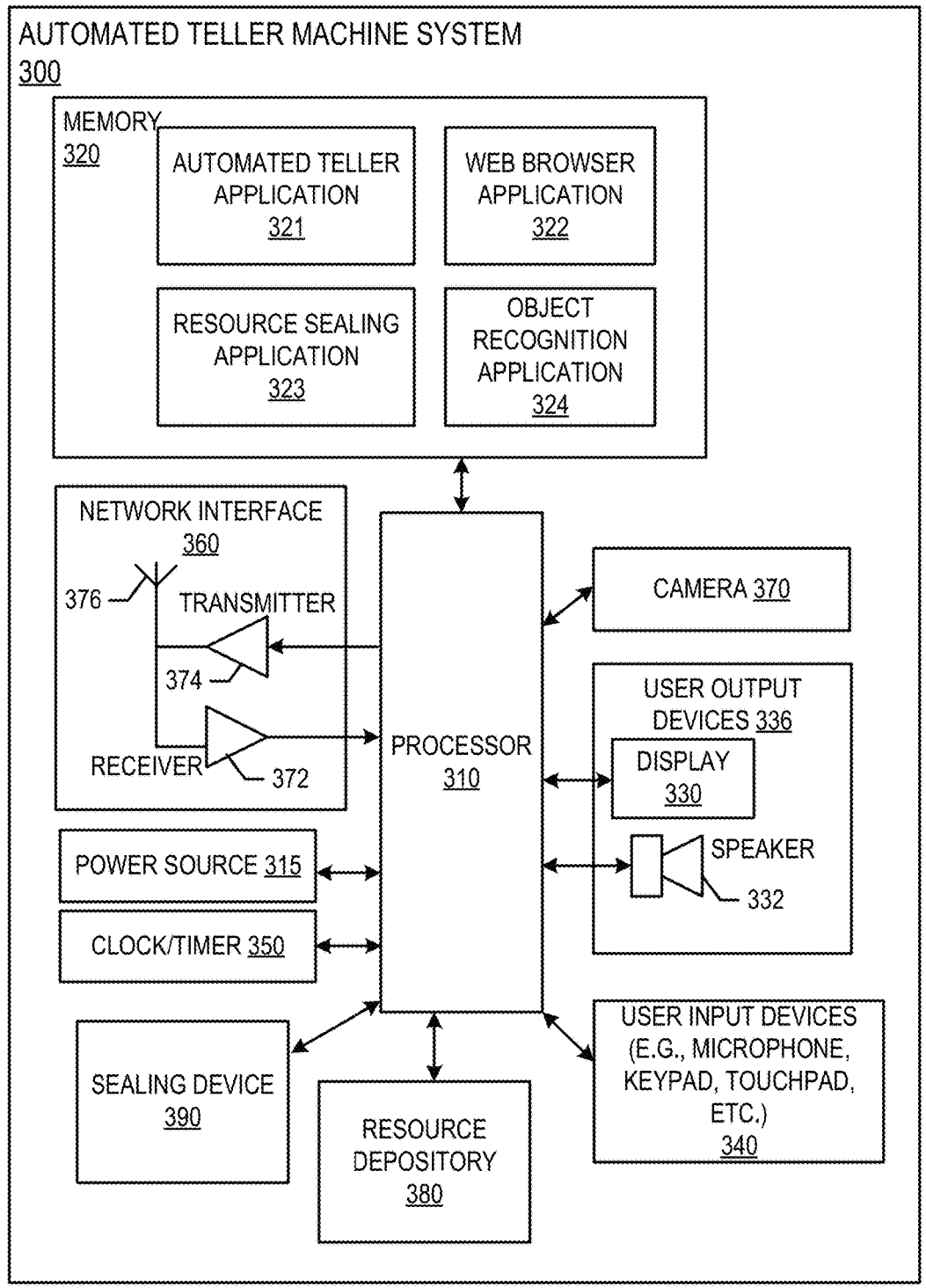
Figure 4:
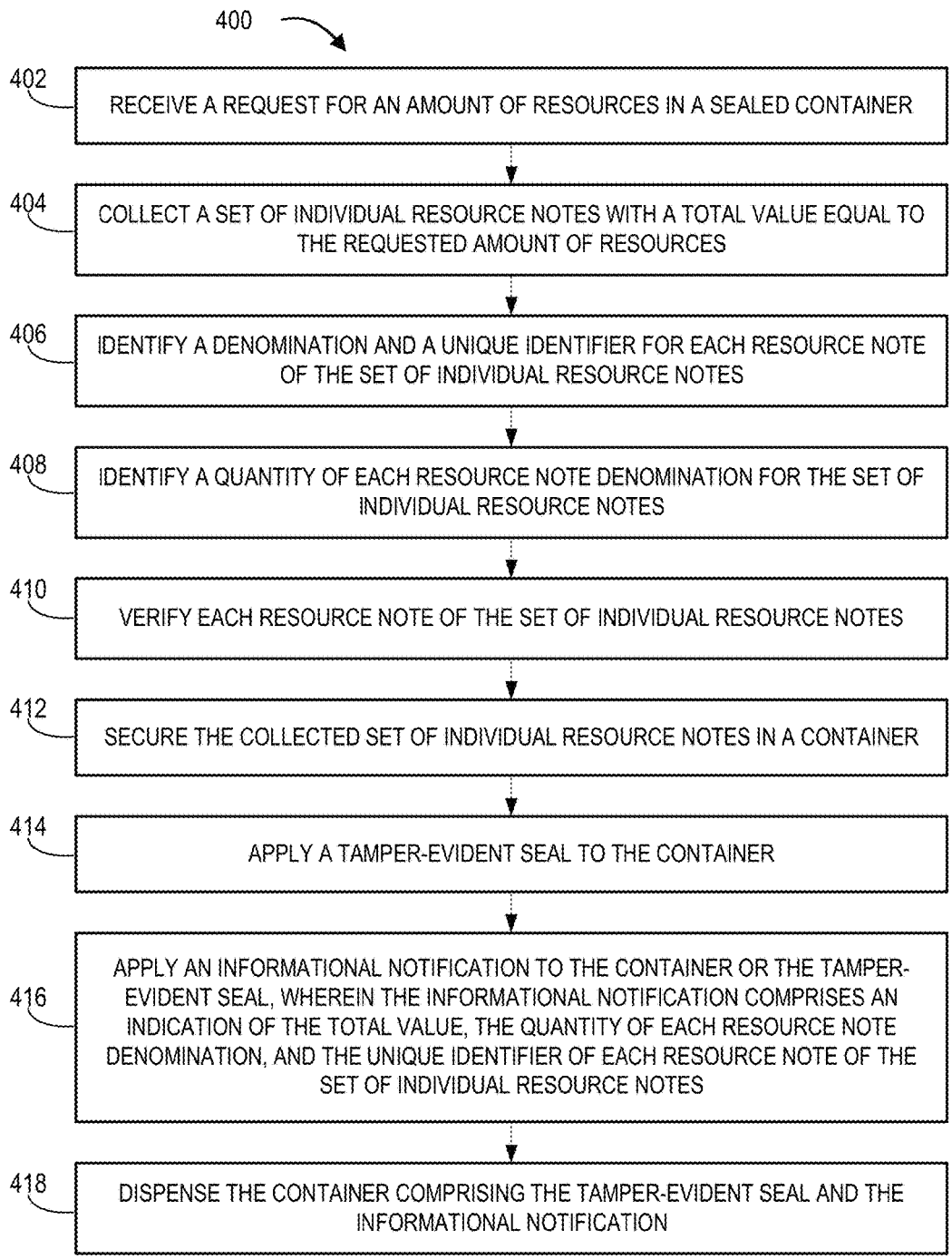
Figure 5A:
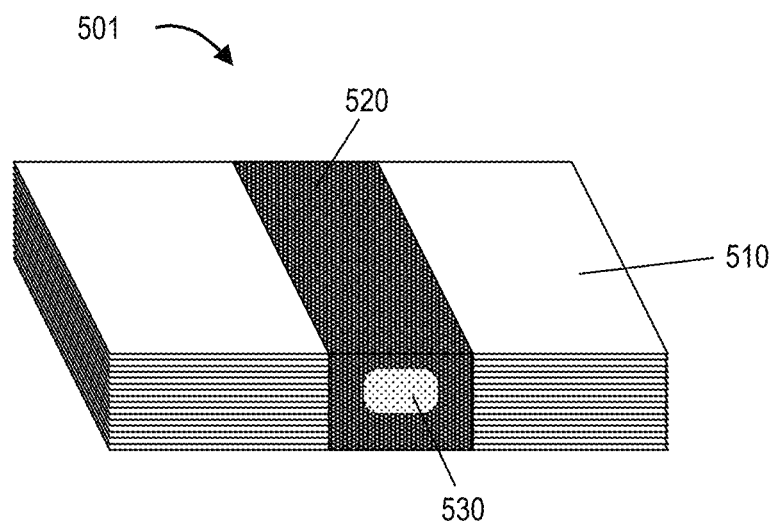
Figure 5B:
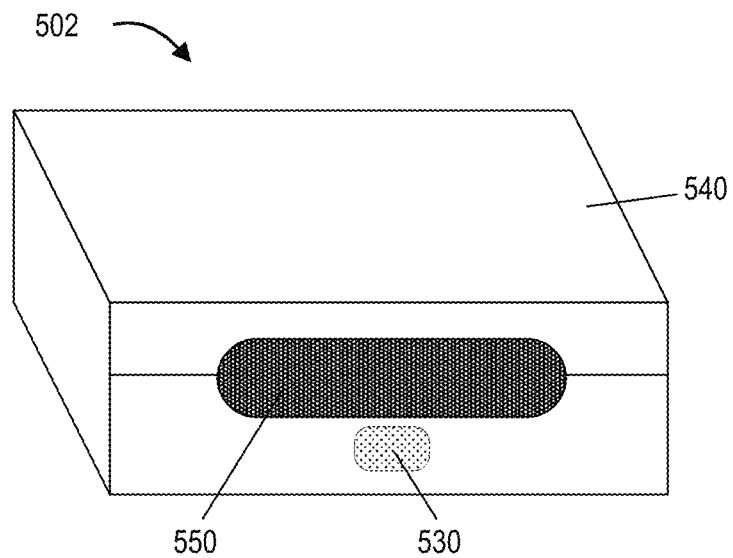

Having thus described embodiments of the invention in general terms, reference will now be made the accompanying drawings, wherein:

FIG. 1 provides a block diagram illustrating a system environment for generating and providing sealed containers of traceable cash, in accordance with an embodiment of the invention;

FIG. 2 provides a block diagram illustrating the managing entity system of FIG. 1, in accordance with an embodiment of the invention;

FIG. 3 provides a block diagram illustrating the automated teller machine system of FIG. 1, in accordance with an embodiment of the invention;

FIG. 4 provides a process flow for generating and providing sealed containers of traceable cash, in accordance with an embodiment of the invention;

FIG. 5A provides an embodiment of a sealed container of cash, in accordance with an embodiment of the invention; and FIG. 5B provides an embodiment of a sealed container of cash, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "cash" or "bank notes" may refer to resources, currency, money, bonds, and the like. Additionally, references to "individual bank notes" or "individual bills" may refer to individual resource items, specific bank notes, specific currency items, specific important items, and the like.

Embodiments of the present invention provide a system and method for generating and providing sealed containers of traceable cash. The sealed containers of traceable cash may be generated and/or produced at an automated teller machine (ATM), by a financial representative at a financial center, or by any computing device configured to identify and verify bank notes, secure them in containers, and apply seals and/or informational notifications (e.g., complex point of sale devices, financial safe devices, self-checkout devices, and the like). Generally, this system allows a user to request an amount (e.g., a value, a specific set of bank note denominations, and the like) of cash to be dispensed in a container. Once the system receives this request, it will collect a set of individual bank notes (e.g., cash, checks, bonds, and the like), where the total value of the collected bank notes is equal to the amount requested by the user. Each individual bank note may be analyzed to identify its denomination and/or serial number. This way, the total quantity of each bank note denomination within the set of individual bank notes may be identified. Furthermore, as the bank notes are collected (or when bank notes are deposited or otherwise received), each bank note may be analyzed to determine whether it is a valid or otherwise authentic bank note. For example, any imitation bank notes, any significantly damaged bank notes, and the like may be identified and replaced with one or more bank notes that can be verified.

Once the collected set of individual bank notes are verified, the system may secure the set of bank notes within a container. For example, the container may comprise a box, a bag, a packet, a strap, a band, an envelope, shrink wrap, netting, a tube, a lockbox, and the like. Once the set of bank notes are stored within the container, a tamper-evident seal may be placed on the container, where the tamper-evident seal will at least disclose a compromising event regarding the opening or physical manipulation of the container and/or the secured bank notes. Furthermore, an informational notification may be placed on the container or the tamper-evident seal. For example, this informational notification may comprise an indication of the total value of the stored bank notes, the quantity of each bank note denomination within the container, and the serial number of each bank note stored within the container. This informational notification may comprise text, an image, a sticker, a near field communication (NFC) chip, a radio frequency identification (RFID) tag, a bar code, a quick response (QR) code, a global positioning system (GPS) tag, and the like. For example, a scanner may be able to scan an NFC chip secured to the container and receive the information about the container and its contents from the received signal.

Finally, now that the container comprising the set of bank notes has a tamper-evident seal and is affixed with an informational notification, the system may dispense the container so the requesting user may receive the container and utilize the container for the user's own purposes. In this way, the system described above (and in more detail below) is configured to generate and provide a sealed container of traceable cash to a user, which allows a user and any subsequent owner or receiver of the container to be confident in the validity, authenticity, denominational makeup, and overall value of the bank notes stored therein.

For example, the user may use the sealed container of traceable cash in a subsequent transaction with a second user (e.g., a merchant, a landlord, and the like). By accessing the informational notification on the container (and by determining that the tamper-evident seal is still intact), the second user can have confidence that the received set of bank notes have already been verified by a financial institution and in fact comprise the bank note denomination quantities set forth in the informational notification. Additionally, if a user deposits the sealed container of traceable cash at a financial center, the financial center can bypass any steps of verification of the bank notes within the sealed container because the bank notes were previously verified by the system and have been sealed within the container ever since the verification.

The step of bypassing a verification step in a cash processing system is a technical improvement to the system of processing (i.e., receiving, identifying, verifying, and the like) deposited cash. Similarly, the denominational and serial number information for the individual bank notes within the sealed container may be used by a cash processing system to bypass any steps of identifying denominations and/or serial numbers of the deposited bank notes.

While the systems and methods described herein relate primarily to the generation and provision of a sealed container of traceable bank notes, it should be known that other types of cash, money, investable materials (e.g., bonds, physical gold or other metallic or gem items, and the like), and/or documents may additionally or alternatively be stored in the containers. For example, a user may wish to purchase an item from a merchant for cash under a purchase order contract. In such cases, the user may request for an amount of cash and a copy (or an original) of the purchase order contract to be secured within the container together. In this way, the user may then present the sealed container comprising the cash and the purchase order contract to the merchant as one single transaction step. The merchant is then able to easily identify which funds are associated with a purchase order as soon as the purchase order is received. Furthermore, the user and the merchant are able to track the origination of the purchase order contract and the cash used for payment through the informational notification.

Furthermore, the system described herein may be used in conjunction with an exchange of goods between two users that require an additional level of security and/or trust. For example, some transactions involve the placement of funds and/or goods in escrow until both sides of the transaction have been submitted and verified. Instead, the system described herein allows a first user to provide a sealed container of verified bank notes of a specific total value and/or allows a second user to provide a sealed container of a verified good (e.g., a piece of expensive jewelry that has been verified by a specialist and immediately secured within a sealed container) that is to be exchanged for the bank notes. As both parties have their own verified sealed containers of cash and/or goods, neither party is required to part with their portion of the transaction (e.g., place the notes or goods in custody or trust of a third party) until the transaction is completed. In this way, if either of the parties changes their mind to the transaction, they do not have to wait to reclaim their portion of the transaction from a third party and instead are able to utilize their item or money in a separate transaction or for a different purpose. However, both parties are also able to complete the initial transaction with confidence that the contents of the containers have been verified by a financial institution and/or an entity with authority to verify such contents.

FIG. 1 provides a block diagram illustrating a system environment 100, in accordance with an embodiment of the invention. As illustrated in FIG. 1, the system environment 100 includes a managing entity system 200, an automated teller machine (ATM) system 300, a processing center system 160, and a third party system 170. Additionally, the system environment 100 may comprise a user 110 that is interacting with the ATM system 300. The user 110 may represent a customer of the managing entity, a customer of a financial entity, and the like. The term "user" shall generally mean a person or entity that may deposit funds, withdraw funds, request a sealed container of cash, and the like.

The managing entity system 200, the ATM system 300, the processing center system 160, and the third party system 170 may be configured to communicate over a network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

In general, the managing entity system 200 is in network communication with other devices, such as the ATM system 300, the processing center system 160, and/or the third party system 170 via the network 150 to generate and provide sealed containers of traceable cash. The managing entity system 200 may be owned by, or otherwise controlled by a managing entity. This managing entity may be a financial entity, a security services entity, an employer, or any other entity that generates and/or provides sealed bundles of cash or important documents to users. The managing entity system 200 is described in more detail with respect to FIG. 2.

The ATM system 300 may comprise any computing device that is configured to generate and/or produce sealed bundles or containers of cash or other important documents. While the ATM system 300 in FIG. 1 references an ATM, it should be known that the ATM system 300 may encompass multiple ATMS, one or more point of sale devices, a financial safe device, or any other computing device configured to perform functions of receiving cash, interacting with users (e.g., the user 110), collect bank notes or other cash, bundle or otherwise secure the bank notes in containers, apply tamper-evident seals to containers, apply informational notices to containers or seals, and dispense or otherwise provide the containers to users (e.g., the user 110). In some embodiments of the inventions, the ATM system 300 is simply configured to carry out the operations of the processes described herein, as instructed by the managing entity system 200 and/or a third party system 170. In other embodiments, the ATM system 300 is configured to provide the appropriate instructions as well as to carry out at least some of the operations necessary for the processes described herein. In some embodiments of the invention, at least a portion of the ATM system 300 is a component of the managing entity system 200. The ATM system 300 is described in greater detail with respect to FIG. 3.

The processing center system 160 may comprise one or more cash processing centers or systems, one or more physical locations of a financial institution, one or more centers or systems for validating the authenticity of bank notes, and/or the like. In some embodiments, the processing center system 160 may be a component of the managing entity system 200. For example, the managing entity may comprise a financial entity that owns or otherwise controls the processing center system 160.

The third party system 170 may be associated with one or more third party entities (e.g., a government agency, a regulatory agency, a financial institution, and the like). The third party system 170 may own or otherwise control one or more aspects of the system environment 100 (e.g., the ATM system 300 or the processing center system 160).

FIG. 2 provides a block diagram illustrating the managing entity system 200 of FIG. 1 in greater detail, in accordance with embodiments of the invention. As illustrated in FIG. 2, and in one embodiment of the invention, the managing entity system 200 includes one or more processing devices 220 operatively coupled to a network communication interface 210 and a memory device 230. In certain embodiments, the managing entity system 200 is operated by a managing entity, such as a financial institution, while in other embodiments, the managing entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the managing entity system 200 described herein. For example, in one embodiment of the managing entity system 200, the memory device 230 includes, but is not limited to, a network server application 240, resource sealing application 250 that includes denomination data 252 and serial number data 254, and a resource processing application 260 that includes verification information 262.

The computer-executable program code of the network server application 240, the resource sealing application 250, or the resource processing application 260 may instruct the processing device 220 to perform certain logic, data-processing, and data-storing functions of the managing entity system 200 described herein, as well as communication functions of the managing entity system 200. For example, the managing entity system 200 may be configured to cause the network communication interface 210 to instruct (and/or receive feedback from) the ATM system 300, the processing center system 160, and/or the third party system 170. In this way, the managing entity system 200 may be configured to cause the components of the system environment 100 to perform certain tasks such as generating and/or providing sealed containers of traceable cash.

In one embodiment, the resource sealing application 250 includes denomination data 252 and serial number data 254. The denomination data 252 may comprise any information associated with techniques for identifying a denomination of a currency. For example, the denomination data 252 may comprise information about sizes, weights, coloring, physical features, artistic features, numerical features, and the like for each denomination of any number of currencies (including foreign currencies). In this way, the managing entity system 200 may be able to compare an input of received currency characteristics with the denomination data 252 to determine a denomination of the currency. Similarly, the serial number data 254 may comprise a datastore of one or more known serial numbers of acquired currency, or currency once acquired. For example, the managing entity system 200 may store any identified serial number data 254 within the resource sealing application 250.

In this way, the managing entity system 200 may be able to identify a serial number for each item of currency (i.e., each bank note) that it has in possession within a single ATM. In some embodiments, the managing entity system 200 may use the cash sealing application to provide instructions to the ATM system 300 regarding total amounts of cash to collect for dispensing, as well as numbers of the denominations in the collected cash and each bank note's respective serial number. Furthermore, the resource sealing application 250 may provide instructions to the ATM system 300 for securing the collected cash into one or more containers, sealing the containers with one or more tamper-evident seals, applying one or more informational notices to the containers and/or seals, and/or dispensing the containers.

The resource processing application 260 of the managing entity system 200 may comprise the verification information 262. This verification information 262 may comprise any information that is useful in assessing the validity or authenticity of any bank note or other verifiable document. Furthermore, the verification information 262 comprise a database of information for which bank notes that have been verified as authentic. In some embodiments, the managing entity system 200 may utilize the cash processing application to cause the ATM system 300, the processing center system 160, and/or the third party system 170 to perform certain functions for analyzing received currency like bank notes to determine the validity or authenticity of the received currency using the verification information 262. For example, a processing center system 160 may have received a sealed container of cash that includes a still-intact tamper-evident seal. The managing entity system 200 may then provide information to the financial center system regarding which bank notes are stored within the sealed container, as well as the validity of each of those bank notes. In such cases, the managing entity system 200 already has a high confidence level regarding the validity of the bank notes, and therefore can instruct the processing center system 160 to bypass one or more cash verification steps that the processing center system 160 would normally perform on bank notes that are received outside of a sealed container like those traceable sealed containers described herein.

As used herein, a "communication interface" generally includes a modem, server, transceiver, and/or other device for communicating with other devices on a network, and/or a user interface for communicating with one or more customers. The network communication interface 210 is a communication interface having one or more communication devices configured to communicate with one or more other devices on the network 150, such as the ATM system 300, the processing center system 160, and/or the third party system 170. The processing device 220 is configured to use the network communication interface 210 to transmit and/or receive data and/or commands to and/or from the other devices connected to the network 150.

FIG. 3 provides a block diagram illustrating at least a portion of the automated teller machine (ATM) system 300 of FIG. 1 in more detail, in accordance with embodiments of the invention. The ATM system 300 may comprise multiple ATMs, point of sale transaction devices, self-checkout devices, financial safe devices, or any other computing devices configured to generate and/or provide sealed containers of traceable cash. However, for the sake of simplicity, the ATM system 300 will be described with respect to FIG. 3 as a single ATM.

Some embodiments of the automated teller machine system 300 include a processor 310 communicably coupled to such devices as a memory 320, user output devices 336, user input devices 340, a network interface 360, a power source 315, a clock or other timer 350, a camera 370, a resource depository 380, and/or a sealing device 390. The processor 310, and other processors described herein, generally include circuitry for implementing communication and/or logic functions of the automated teller machine system 300. For example, the processor 310 may include a digital signal processor device, a microprocessor device, and various analog to digital converters, digital to analog converters, and/or other support circuits. Control and signal processing functions of the automated teller machine system 300 are allocated between these devices according to their respective capabilities. The processor 310 thus may also include the functionality to encode and interleave messages and data prior to modulation and transmission. The processor 310 can additionally include an internal data modem. Further, the processor 310 may include functionality to operate one or more software programs, which may be stored in the memory 320. For example, the processor 310 may be capable of operating a connectivity program, such as a web browser application 322. The web browser application 322 may then allow the automated teller machine system 300 to transmit and receive web content, such as, for example web page content, according to a Wireless Application Protocol (WAP), Hypertext Transfer Protocol (HTTP), and/or the like.

The processor 310 is configured to use the network interface 360 to communicate with one or more other devices on the network 150. In this regard, the network interface 360 includes an antenna 376 operatively coupled to a transmitter 374 and a receiver 372 (together a "transceiver"). The processor 310 is configured to provide signals to and receive signals from the transmitter 374 and receiver 372, respectively. The signals may include signaling information in accordance with the air interface standard of the applicable cellular system of the wireless telephone network 152. In this regard, the automated teller machine system 300 may be configured to operate with one or more air interface standards, communication protocols, modulation types, and access types. By way of illustration, the automated teller machine system 300 may be configured to operate in accordance with any of a number of first, second, third, and/or fourth-generation communication protocols and/or the like. For example, the automated teller machine system 300 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The automated teller machine system 300 may also be configured to operate in accordance with non-cellular communication mechanisms, such as via a wireless local area network (WLAN) or other communication/data networks. Of course, the network interface 360 may also comprise a wireline connection to at least a portion of the network 150.

As described above, the automated teller machine system 300 has a user interface that is, like other user interfaces described herein, made up of user output devices 336 and/or user input devices 340. The user output devices 336 include a display 330 (e.g., a liquid crystal display or the like) and a speaker 332 or other audio device, which are operatively coupled to the processor 310. The user input devices 340, which allow the automated teller machine system 300 to receive data from a user such as the user 110, may include any of a number of devices allowing the automated teller machine system 300 to receive data from the user 110, such as a keypad, keyboard, touch-screen, touchpad, microphone, mouse, joystick, other pointer device, button, soft key, and/or other input device(s). The user interface may also include a camera 370, such as a digital camera.

The automated teller machine system 300 further includes a power source 315, such as a battery or power line, for powering various circuits and other devices that are used to operate the automated teller machine system 300. Embodiments of the automated teller machine system 300 may also include a clock or other timer 350 configured to determine and, in some cases, communicate actual or relative time to the processor 310 or one or more other devices.

The automated teller machine system 300 also includes a memory 320 operatively coupled to the processor 310. As used herein, memory includes any computer readable medium (as defined herein below) configured to store data, code, or other information. The memory 320 may include volatile memory, such as volatile Random Access Memory (RAM) including a cache area for the temporary storage of data. The memory 320 may also include non-volatile memory, which can be embedded and/or may be removable. The non-volatile memory can additionally or alternatively include an electrically erasable programmable read-only memory (EEPROM), flash memory or the like.

The memory 320 can store any of a number of applications which comprise computer-executable instructions/code executed by the processor 310 to implement the functions of the automated teller machine system 300 and/or one or more of the process/method steps described herein. For example, the memory 320 may include such applications as an automated teller application 321, a conventional web browser application 322, a resource sealing application 323, and/or an object recognition application 324. These applications also typically provide a graphical user interface (GUI) on the display 330 that allows the first user 110 to communicate with the automated teller machine system 300, the processing center system 160, and/or other devices or systems.

The memory 320 can also store any of a number of pieces of information, and data, used by the automated teller machine system 300 and the applications and devices that make up the automated teller machine system 300 or are in communication with the automated teller machine system 300 to implement the functions of the automated teller machine system 300 and/or the other systems described herein. For example, the memory 320 may include such data as user authentication information, and the like.

The automated teller application 321 of the memory 320 may comprise instructions for causing components of the ATM system 300 to perform certain functions that relate to transactions, deposits, withdrawals, and other financial actions. For example, the automated teller application 321 may cause the user output devices 336 to output certain information to a user (e.g., the user 110) and/or allow a user to input information regarding a financial transaction by using the user input devices 340. A user may be able to deposit an amount of cash into the automated teller system by inserting bank notes and/or coins into the resource depository 380 of the ATM system 300. The automated teller application 321 may cause one or more components of the ATM system 300 to measure, track, and/or store the deposited bank notes and/or coins, and store this information in the memory 320 for later use.

The object recognition application 324 may instruct one or more components of the ATM system 300 to detect, measure, analyze, or otherwise identify information found on (or associated with) the deposited bank notes and/or coins. For example, the object recognition application 324 may cause the camera 370 to acquire an image of a received bank note, where the image can then be analyzed by the object recognition application 324 to identify one or more useful features of the received bank note. In some embodiments, the object recognition application 324 and/or the automated teller application 321 may be configured to identify denominations of received currency, serial numbers of received currency, and/or make determinations on the validity of received currency.

The resource sealing application 323 of the memory 320 may be configured to provide instructions to components of the ATM system 300 for collecting, securing, bundling, and/or otherwise sealing one or more bank notes, coins, other currency, or other important documents. For example, the resource sealing application 323 may cause the resource depository 380 to collect a specific amount of bank notes (e.g., an amount with a specific total value, an amount of one or more specific currency denominations, and the like). The resource sealing application 323 may then transmit instructions to the cash sealing device 390 of the ATM system 300 to cause the cash sealing device 390 to secure the collected cash in a container and/or apply a seal to a container of collected cash. In some embodiments, the resource sealing application 323 and/or the automated teller application 321 may additionally cause one or more components of the ATM system 300 to apply an informational notification to the container of cash and/or dispense the container of cash such that a user (e.g., the user 110) may access the container.

Referring now to FIG. 4, a flowchart is provided to illustrate one embodiment of a process 400 for generating and providing sealed containers of traceable cash, in accordance with embodiments of the invention. At least a portion of the process 400 may be conducted by, through, or within an automated teller machine (ATM) system (e.g., the ATM system 300), or any other computing device configured to carry out at least some of the steps described herein. In some embodiments, at least a portion of the process 400 may be performed by one or more individual members of the managing entity (e.g., a financial entity employee).

In some embodiments, the process 400 may include block 402, where the system receives a request for an amount of resources in a sealed container. In some embodiments, the resources may comprise cash, bank notes, an item of value, or the like. This request may come from a user (e.g., the user 110). For example, a user may input a request for a desired amount of cash via a user interface of an ATM. Alternatively, the user may submit a request via an online web browser, a mobile device, a request at a financial center, and the like. The request may be for a specific value of bank notes. Additionally or alternatively, the request may comprise a request for a specific quantity of one or more denominations of bank notes.

In some embodiments, the received request may comprise a request for one or more items that are not bank notes. For example, a user may submit a request that includes coins, legal documents, contracts, metals, gems, secure information (e.g., written on a card or other item), and the like. In this way, the request may be for contents of a safety deposit box associated with the user. The request, in some embodiments, may be associated with a specific contract for sale, or some other transaction that involves bank notes and/or one or more non-bank note items.

The system may be set up with a user interface that allows a user to select a request for a preset amount of cash to be provided in a sealed container. This preset amount may be for any amount and may be set by the managing entity, the user, a third party, and the like. In some embodiments, the system may track the user's transaction history to determine a common amount of cash that the user requests, and this common amount can be presented as a preset amount of cash that can be provided in a sealed container.

Additionally or alternatively, the step of receiving the request for the amount of cash in the sealed container is associated with a deposited amount of cash, wherein the deposited amount of cash comprises the set of individual notes. For example, a user may already have the desired amount of cash, but wishes to put that same cash in a sealed container. In this way, the user may deposit the cash and simultaneously submit a request for that cash to be placed in a sealed container. Similarly, the user may deposit one or more non-cash items that are to be placed in the sealed container. For example, the user may deposit one or more pieces of jewelry that is to be placed in the sealed container.

In some embodiments, the process 400 includes block 404, where the system collects a set of individual resources with a total value equal to the requested amount of resources. In some embodiments, this step comprises the collection of a set of individual bank notes with a total value equal to a requested amount of cash. Once the request has been received, the system can begin to process the request based on any input received from the user. For example, if the user deposited at least a portion of the amount of cash that is to be placed in the sealed container, the system may collect the deposited bank notes as part of its block 404. Additionally or alternatively, the system can collect any specifically requested denominations of cash from a cash depository stored within the system. For example, if the system includes (or otherwise comprises) an ATM, the system may withdraw the requested denominations of funds (or the total amount of funds) from cash depositories within the ATM. Furthermore, any non-bank note items may also be collected along with the individual bank notes. For simplicity's sake, the collected set of individual bank notes shall include any non-bank note items from the request, even if a step described herein refers to only the bank notes.

Additionally, in some embodiments, the process 400 includes block 406, where the system identifies a denomination and a unique identifier (e.g., a serial number, and the like) for each resource of the set of individual resources. In some embodiments, this step comprises the identification of a denomination and a serial number for each bank note of the set of individual bank notes. As such, the system may identify information regarding each individual bank note. This information can be useful in future steps described herein, but generally this information is helpful in providing a comprehensive overview of the contents of the sealed container that is generated and provided herein. This identification step may comprise scanning each individual bank note with a camera or other optical sensing technology to identify numbering and/or lettering (e.g., the denomination, the issuing financial institution, the serial number, and the like) on the bank note. Additional sensors may be used to identify a size, weight, fabric and/or metallic makeup of the bank note, and the like. Furthermore, magnetic properties of coins and/or ink on bank notes may be analyzed and recorded.

The process 400 may also include block 408, where the system identifies a quantity of each resource denomination for the set of individual resources. In some embodiments, this step comprises identifying a quantity of each bank note denomination for the set of individual bank notes. As such, once the denomination of each individual bank note is identified, each set of denominations can be tallied up to identify a total number of each denomination within the collected set of individual bank notes. Again, this information can be useful in providing a detailed report on the contents of the generated and provided sealed container of cash.

In some embodiments, the process 400 includes block 410, where the system verifies each resource of the set of individual resources. In some embodiments, this step may comprise verifying each bank note of the set of individual bank notes. Again, the system may utilize multiple sensors (e.g., optical sensors, infrared sensors, weight sensors, fabric makeup sensors, metallic makeup sensors, magnetic sensors, ink makeup sensors, and the like) to make a determination on the validity and/or authenticity of each individual bank note. In some embodiments, this step produces a "verified" or "cannot be verified" result for each bank note. In other embodiments, the system's analysis of the validity and/or authenticity of each bank note produces a result in the form of a confidence score. For example, the system may provide a numerical or percentage-based confidence score. As long as the confidence score is at or above a predefined threshold for authenticity, then the individual bank note is considered verified. However, if the determined confidence score is below the predefined threshold for authenticity, then that individual bank note is determined to not be verified.

Of course, sometimes one or more bank notes cannot be verified. This may be dues to physical wear and tear, aging of bank notes, a desire to remove older or damaged bank notes from circulation, an identification of an imitation bank note, and the like. Therefore, in block 410 may include additional steps of identifying a first individual bank note of a first denomination from the set of individual bank notes that cannot be identified. Next, and in response to identifying the first individual bank note that cannot be verified, the system may remove the first individual bank note from the collected set of individual bank notes. In this way, the system purges the collected set of individual bank notes of any bank notes that cannot be verified. Furthermore, the system may replace the first individual bank note with a verified replacement individual bank note of that same first denomination. Therefore, once the system has completed the verification and/or replacement steps for each of the collected set of individual bank notes, the remaining set of collected bank notes will be fully verified by the system.

Additionally, in some embodiments, the process 400 includes block 412, where the system secures the collected set of individual resources in a container. In some embodiments, the system may secure the collected set of individual bank notes in a container. As used herein, the term "container" may refer to any box, bag, packet, strap, band, envelope, shrink wrap, netting, lockbox, safety deposit box, or any other container that is configured to securely store bank notes. As such, a component of the system may physically place the collected and verified set of individual bank notes within the container (or place the container around the collected and verified set of individual bank note). In some embodiments, the container is closed, and possibly locked if locking the container is desired. Generally, the container is configured to securely hold the set of individual bank notes in a manner that prevents or at least reduces the likelihood of destruction or other compromising incidents of one or more bank notes within the container. In this way, a user can expect that the bank notes initially placed in the container will be the same valid bank notes once the container is opened.

The process 400 may include block 414, where the system applies a tamper-evident seal to the container. The tamper-evident seal may be placed in one or more locations on the container in such a manner that the container cannot be opened and/or the bank notes within the container cannot be compromised without the tamper-evident seal revealing such an event. For example, if the container is a box with a flap, the tamper-evident seal may be placed across the flap in such a manner that the contents of the box container cannot be accessed or otherwise compromised without the tamper-evident seal being damaged, displaced, or the like. In this way, a subsequent recipient of the sealed container can be confident that the contents of the sealed container have not been compromised as long as the tamper-evident seal is still intact.

The tamper-evident seal, in some embodiments, may be the same as (or may be a significant component of) the container. For example, a currency strap (possibly used in conjunction with a shrink wrap or other container) may provide container characteristics and additionally provide a tamper-evident seal. Examples of the container and the tamper-evident seal are provided in FIGS. 5A and 5B.

Furthermore, the process 400 may include block 416, where the system applies an informational notification to the container or the tamper-evident seal, wherein the informational notification comprises an indication of the total value, the quantity of each resource denomination, and the serial number of each resource of the set of individual resources. In some embodiments, this step comprises applying an informational notification to the container or the tamper-evident seal, wherein the informational notification comprises an indication of the total value, the quantity of each bank note denomination, and the serial number of each bank note of the set of individual bank notes. As used herein, the term "informational notification" may refer to any image, text, sticker, chip, or other notification that may be affixed to or otherwise incorporated within or on the container and/or the tamper-evident seal. The informational notification may comprise a near field communication (NFC) chip, a radio frequency identification (RFID) tag, a bar code, a quick response (QR) code, a global positioning system (GPS) tag, and/or the like.

The informational notification may, on its face, provide the information about the contents and/or the validity of the contents stored in the sealed container. Additionally or alternatively, the informational notification may comprise a signal that, when scanned and analyzed, provides the information regarding the contents and/or the validity of the contents stored in the sealed container. Furthermore, the informational notification may comprise a signal that, when scanned and analyzed, directs a scanning device and/or a user (e.g., via a mobile device display, an ATM display, a computing device display, and the like) to a database and/or webpage that lists or otherwise provides the information regarding the contents and/or the validity of the contents stored in the sealed container.

In embodiments where the informational notification comprises a GPS tag, the system may be configured to track the GPS tag over time (e.g., periodically or continuously) to monitor a location of the sealed container. In some embodiments, the system may determine that the GPS tag is present in a location determined to be associated with compromising the contents of the sealed container. In such scenarios, the system may adjust a web-based informational notification to change the status of the contents of the container from "verified" to "cannot be verified."

Furthermore, informational notification may comprise information about a location where the individual bank notes are being secured into the container (i.e., the location where the container of traceable cash is dispensed), a device number of the device generating and/or producing the sealed container of traceable cash, a store number or location where the sealed container of traceable cash is generated or dispensed, and the like. In this way, the system may determine and record information about where individual bank notes originate, transfer to, and otherwise progress within a network of devices, locations, accounts, and the like that are owned or otherwise managed by the managing entity. This allows the managing entity to track the flow of individual bank notes throughout its network.

Finally, the process 400 may continue to block 418, where the system dispenses the container comprising the tamper-evident seal and the informational notification. For example, an ATM system may dispense the container on site to the user. In some embodiments, the system may generate the sealed container in one location (e.g., a financial center) and provide a notice to the user to inform the user that the sealed container is ready to be picked up. Generally, the system dispenses to the container to the user in a manner that allows the user to access the container and remove the container for the user's own purpose. As the sealed container is mobile, the user or any subsequent owner may travel with the container, exchange the container with a second user, and/or deposit the container at a financial center.

Additionally, once the system has generated and dispensed the sealed container of traceable cash, this container may be utilized in a subsequent transaction or deposit. Because the individual bank notes within the sealed container of traceable cash have been identified and verified, the system may be able to instruct one or more systems or entities to bypass a cash verification process if those systems or entities can confirm that the tamper-evident seal is still intact. In this way, the system may receive the container comprising the collected and verified cash, determine that the tamper-evident seal is intact, and bypass a new verification process for the collected and verified amount of cash secured in the container. The verified nature of the bank notes within the sealed container improve the efficiency of cash processing steps because each individual note within the container does not need to be analyzed for validity or authenticity, as these bank notes have already been verified and held in a secured state.

In some embodiments, the sealed container of traceable cash may be provided to a commercial client of the managing entity. In this way, the commercial client may have a high confidence in the contents of the container, and may bypass at least some of its own internal processing steps based on the informational notification of the container.

FIG. 5A provides an embodiment of a sealed container of cash 501, in accordance with an embodiment of the invention. As illustrated in FIG. 5A, the sealed container of cash 501 may comprise a set of one or more resources 510, a combined container and tamper-evident seal 520, and an informational notification 530. The sealed container of cash 501 is represented with the combined container and tamper-evident seal 520 comprising a tamper-evident cash strap. The combined container and tamper-evident seal 520 securely hold a set of individual resources 510 (e.g., individual bank notes, sets of bank notes, bonds, important documents, other important items, and the like). The informational notification 530 is secured or otherwise incorporated with the combined container and tamper-evident seal 520, such that the informational notification 530 can be read and/or scanned to allow a user or cash processor to retrieve information regarding the contents of the combined container and tamper-evident seal 520.

FIG. 5B provides an embodiment of a sealed container of cash 502, in accordance with an embodiment of the invention. As illustrated in FIG. 5B, the sealed container of cash 502 may comprise a container 540, a tamper-evident seal 550, and an informational notification 530. In such an embodiment, the one or more individual bank notes (and any other secured documents or items) are stored within the container 540. Here, the container 540 comprises a closed box with a front flap. The tamper-evident seal 550 secures the front flap of the container 540, sealing the individual bank notes within the container 540 in a manner that would reveal any compromising event (e.g., the tamper-evident seal 550 is broken or removed as the container 540 is opened, water damage, heat damage, and the like). In this embodiment of the sealed container of cash 502, the informational notification 530 is secured to the container 540. Of course, the informational notification 530 could additionally or alternatively be secured to the tamper-evident seal 550 in other embodiments of the invention.

It should be noted that while FIG. 5A and FIG. 5B provide sample illustrations of possible sealed containers of cash 501 and 502, they do not comprise the entire set of possible sealed containers of cash. Instead, the sealed containers of cash can be comprised of any combination of the individual bank notes, non-bank note items, containers, tamper-evident seals, and informational notifications. The sample illustrations are not mean to be limiting in any way, and are merely examples of two possible embodiments of the invention.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 15/598,574 now published as 2018/0336508 | RESOURCE GRID SYSTEM FOR TRACKING AND RECONCILING RESOURCE MOVEMENT | Concurrently herewith |
| 15/598,583 now published as 2018/0336511 | SYSTEM FOR PROCESSING RESOURCE DEPOSITS | Concurrently herewith |
| 15/598,579 now published as 2018/0336766 | SYSTEM FOR PROVIDING ON-DEMAND RESOURCE DELIVERY TO RESOURCE DISPENSERS | Concurrently herewith |
| 15/599,124 now published as 2018/0336536 | SYSTEM FOR PROVIDING REAL-TIME TRACKING OF INDIVIDUAL RESOURCE ITEMS TO IDENTIFY SPECIFIC RESOURCE TRANSFERS | Concurrently herewith |
| 15/599,129 now published as 2018/0336555 | SYSTEM FOR PROVIDING REAL-TIME TRACKING OF INDIVIDUAL RESOURCE ITEMS TO IDENTIFY UNAUTHORIZED RESOURCE TRANSFERS | Concurrently herewith |
| 15/598,589 now published as 2018-0336538 | SYSTEM FOR PROCESSING DEPOSIT OF RESOURCES WITH A RESOURCE MANAGEMENT SYSTEM | Concurrently herewith |

The invention claimed is:

1. A system for providing a sealed container of traceable resources, the system comprising:
   a physical container;
   a container dispensing device, the container dispensing device comprising:
      a first memory device; and
      a first processing device operatively coupled to the first memory device, wherein the first processing device is configured to execute computer-readable program code to:
         receive a request for an amount of resources in a sealed container;
         collect a set of individual resource items with a total value equal to the requested amount resources, wherein the individual resource items comprise physical items;
         identify a denomination and a unique identifier for each resource item of the set of individual resource items;
         identify a quantity of each resource item denomination for the set of individual resource items;
         verify each resource item of the set of individual resource items;
         in response to verifying each resource item of the individual resource items, secure the collected set of individual resource items in the physical container;
         apply a tamper-evident seal across a flap of the physical container to secure the flap to a side of the physical container;
         affix an informational notification to the physical container or the tamper-evident seal, wherein the informational notification comprises an indication of the total value, the quantity of each resource item denomination, and the unique identifier of each resource item of the set of individual resource items;

dispense the physical container comprising the tamper-evident seal and the informational notification; and
a container receiving device comprising:
a second memory device; and
a second processing device operatively coupled to the first memory device, wherein the second processing device is configured to execute computer-readable program code to:
receive the physical container;
determine that the tamper-evident seal is intact across the flap of the physical container; and
in response to determining that the tamper-evident seal is intact, bypass all other verification and inspection processes for the collected and verified amount of resources secured in the physical container.

2. The system of claim 1, wherein receiving the request for the amount of resources in the sealed container is associated with a deposited amount of resources, wherein the deposited amount of resources comprises the set of individual resource items.

3. The system of claim 1, wherein the request for the amount of resources in the sealed container comprises a request for a preset amount of resources.

4. The system of claim 1, wherein the first processing device is further configured to execute computer-readable program code to:
identify a first individual resource item of a first denomination from the set of individual resource items that cannot be verified;
in response to identifying the first individual resource item that cannot be verified, remove the first individual resource item from the collected set of individual resource items; and
replace the first individual resource item with a verified replacement individual resource item of the first denomination.

5. The system of claim 1, wherein the physical container comprises a box, a bag, a packet, a strap, a band, an envelope, or shrink wrap.

6. The system of claim 1, wherein the informational notification comprises a near field communication chip, a radio frequency identification tag, a bar code, a quick response code, or a global position system tag.

7. The system of claim 1, wherein the second processing device of the container receiving device is further configured to execute computer readable program code to:
in response to bypassing the all other verification and inspection processes for the collected and verified amount of resources secured in the physical container, and in exchange for the physical container, provide a good to a user associated with the physical container.

8. A computer program product for providing a sealed container of traceable cash, the computer program product comprising at least one non-transitory computer readable medium comprising computer readable instructions, the instructions comprising instructions for:
receiving, at a container dispensing device, a request for an amount of cash in a sealed container;
collecting a set of individual bank notes with a total value equal to the requested amount of cash, wherein the individual bank notes comprise physical bank notes;
identifying a denomination and a serial number for each bank note of the set of individual bank notes;
identifying a quantity of each bank note denomination for the set of individual bank notes;
verifying each bank note of the set of individual bank notes;
in response to verifying each bank note of the set of individual bank notes, securing the collected set of individual bank notes in a physical container;
applying a tamper-evident seal across a flap of the physical container to secure the flap to a side of the physical container;
affixing an informational notification to the container or the tamper-evident seal, wherein the informational notification comprises an indication of the total value, the quantity of each bank note denomination, and the serial number of each bank note of the set of individual bank notes;
dispensing the physical container comprising the tamper-evident seal and the informational notification;
receiving, at a container receiving device, the physical container;
determining that the tamper-evident seal is intact across the flap of the physical container; and
in response to determining that the tamper-evident seal is intact, bypass all other verification and inspection processes for the collected and verified amount of bank notes secured in the physical container.

9. The computer program product of claim 8, wherein receiving the request for the amount of cash in the sealed container is associated with a deposited amount of cash, wherein the deposited amount of cash comprises the set of individual bank notes.

10. The computer program product of claim 8, wherein the request for the amount of cash in the sealed container comprises a request for a preset amount of cash.

11. The computer program product of claim 8, wherein the computer readable instructions further comprise instructions for:
identifying a first individual bank note of a first denomination from the set of individual bank notes that cannot be verified;
in response to identifying the first individual bank note that cannot be verified, removing the first individual bank note from the collected set of individual bank notes; and
replacing the first individual bank note with a verified replacement individual bank note of the first denomination.

12. The computer program product of claim 8, wherein the physical container comprises a box, a bag, a packet, a strap, a band, an envelope, or shrink wrap.

13. The computer program product of claim 8, wherein the informational notification comprises a near field communication chip, a radio frequency identification tag, a bar code, a quick response code, or a global positioning system tag.

14. The computer program product of claim 8, wherein the computer readable instructions further comprise instructions for:
in response to bypassing the all other verification and inspection processes for the collected and verified amount of bank notes secured in the physical container, and in exchange for the physical container, providing a good to a user associated with the physical container.

15. A computer implemented method for providing a sealed container of traceable cash, said computer implemented method comprising:
providing a computing system comprising a computer processing device and a non-transitory computer readable medium, where the computer readable medium comprises configured computer program instruction code, such that when said instruction code is operated by said computer processing device, said computer processing device performs the following operations:

receiving, at a container dispensing device, a request for an amount of cash in a sealed container;

collecting a set of individual bank notes with a total value equal to the requested amount of cash, wherein the individual bank notes comprise physical bank notes;

identifying a denomination and a serial number for each bank note of the set of individual bank notes;

identifying a quantity of each bank note denomination for the set of individual bank notes;

verifying each bank note of the set of individual bank notes;

in response to verifying each bank note of the set of individual bank notes, securing the collected set of individual bank notes in a physical container;

applying a tamper-evident seal across a flap of the physical container to secure the flap to a side of the physical container;

affixing an informational notification to the physical container or the tamper-evident seal, wherein the informational notification comprises an indication of the total value, the quantity of each bank note denomination, and the serial number of each bank note of the set of individual bank notes;

dispensing the container comprising the tamper-evident seal and the informational notification;

receiving, at a container receiving device, the physical container;

determining that the tamper-evident seal is intact across the flap of the physical container; and in response to determining that the tamper-evident seal is intact, bypassing all other verification and inspection processes for the collected and verified amount of bank notes secured in the physical container.

16. The computer implemented method of claim 15, wherein receiving the request for the amount of cash in the sealed container is associated with a deposited amount of cash, wherein the deposited amount of cash comprises the set of individual bank notes.

17. The computer implemented method of claim 15, further comprising:

identifying a first individual bank note of a first denomination from the set of individual bank notes that cannot be verified;

in response to identifying the first individual bank note that cannot be verified, removing the first individual bank note from the collected set of individual bank notes; and replacing the first individual bank note with a verified replacement individual bank note of the first denomination.

18. The computer implemented method of claim 15, wherein the physical container comprises a box, a bag, a packet, a strap, a band, an envelope, or shrink wrap.

19. The computer implemented method of claim 15, wherein the informational notification comprises a near field communication chip, a radio frequency identification tag, a bar code, a quick response code, or a global positioning system tag.

20. The computer implemented method of claim 15, further comprising:

in response to bypassing the all other verification and inspection processes for the collected and verified amount of bank notes secured in the physical container, and in exchange for the physical container, providing a good to a user associated with the physical container.

* * * * *